United States Patent Office 3,259,574
Patented July 5, 1966

3,259,574
PREPARATION OF SUSPENSIONS OF WATER-SOLUBLE SOLIDS IN OLEAGINOUS MEDIA
Walter Morrison and Henry Stevenson, Sunbury-on-Thames, England, assignors to The British Petroleum Company Limited, London, England, a British joint-stock corporation
No Drawing. Filed Apr. 17, 1963, Ser. No. 273,572
Claims priority, application Great Britain, Apr. 24, 1962, 15,532/62
5 Claims. (Cl. 252—28)

This invention relates to the preparation of a suspension of a water-soluble solid in an oleaginous medium. British patent specification 778,822 describes a method of preparing such dispersions in which an aqueous solution of the water soluble solid is dispersed in an oil to give a water-in-oil emulsion, preferably using an emulsifying agent, and this emulsion is dehydrated, preferably by heating. The dehydration is the most difficult stage of the process since the emulsion may break (or coagulation may occur). Satisfactory dehydration may be achieved by using particular dehydration techniques, e.g., passing between heated rollers or by spraying fine droplets of the emulsion into a hot stream of air (i.e., by spray drying). Specific emulsifiers exist which are particularly effective for stabilising the emulsion during dehydration. When the exceptional emulsifiers are used the emulsion may be dehydrated simply by heating, with stirring if necessary to prevent excessive foaming; e.g., the use of a petroleum wax oxidate is described in British patent specification 902,623.

Where the dispersion is eventually to be incorporated into a grease any emulsifier used during the preparation of the dispersion is naturally to be found in the final grease composition. The presence of an emulsifier in a grease is normally considered undesirable.

It is known to use colloidal clays whose particles are coated with an oleophyllic substance as grease thickening agents. These materials will hereinafter be called "clay-type thickeners." An example of a clay-type thickener is a material consisting of platelets of montmorillonite coated with a quaternary ammonium salt. The clay-type thickeners have not, as far as we know, been considered to have emulsifying or dispersing properties. We have now found that they may be used, in place of the emulsifying agent, in the prepartion of dispersions as described above.

Accordingly the invention comprises a method of preparing a suspension of particles of a water-soluble solid in an oleaginous medium, in which an aqueous solution of the solid is emulsified with an oleaginous liquid to form a water-in-oil emulsion and the emulsion is thereafter dehydrated, the emulsification and dehydration both being carried out in the presence of a clay-type thickener.

In carrying out the method of the invention, the clay-type thickener may conveniently be dispersed in the oleaginous liquid and the aqueous solution thereafter added. The emulsion may be produced by agitation of the mixture, e.g., by rapid stirring, milling or both. Dehydration of the emulsion may be most conveniently effected by heating, e.g., at a temperature of 115°–170° C. During dehydration by heating it is advisable to continue stirring the emulsion to reduce foaming and to ensure that the emulsion does not break.

The oleaginous liquid may be a mineral oil, e.g., a lubricating oil, a residue, a fuel oil or kerosine. It may also be a vegetable oil, e.g., castor oil, or a synthetic oil, e.g., a diester, a polyester, a polyglycol, a polyether or a silicon-containing synthetic oil. In order to produce a lubricating grease containing a dispersion of a water-soluble solid, a dispersion of the solid in lubricating oil prepared as described above may be either mixed with a grease or thickened to a grease consistency in known manner with a grease-forming agent.

Preferably the concentration of water-soluble solid in the final composition is 0.5–25% by weight.

Preferably the amount of clay-type thickener used for making the emulsion is 0.2–5%, preferably 0.5–1.0%, by weight based on the oleaginous liquid.

In general it is desirable to use a fairly concentrated solution of the water-soluble solid as this reduces the amount of water which has to be removed from the emulsion. Solutions having a solid concentration of 20–70% wt. are particularly satisfactory.

Water-soluble solids which can be suspended in oleaginous media by the method according to the invention include water-soluble corrosion-inhibitors such as alkali metal and ammonium nitrites, carbonates, bicarbonates, sulphites, borates, chlorates, perchlorates hypochlorites, silicates, phosphates, salicylates, citrates, tannates, lactates, tartrates, oxalates, phthalates, acetates, iodates, arsenites, chromates, molybdates, and tungstates, and amine nitrites, phosphates and iodates. However, the invention is not limited to the case of water-soluble solids that are corrosion inhibitors. Examples of other water-soluble solids that may be used include water-soluble extreme pressure agents (such as hydroxy fatty acids, polycarboxylic acids, hydroxy polycarboxylic acids, organic salts (e.g., sodium benzoate), amides and amino acids) and water-soluble acid-accepting solids (such as calcium acetate).

If a clay-type thickening agent is mixed with a lubricating oil in order to make a grease, the full potential thickening may not be achieved. In these cases it is common practice to add an activating agent, e.g., acetone, to the mixture and this enables the full potential thickening effect to be achieved. The activating agent evaporates so that none remains in the final composition. When utilising a clay-type thickener which is normally used with an activating agent in a process according to the invention it is preferable to use the activating agent. In this case the oil, clay-type thickener and activating agent are mixed together and the aqueous solution is dispersed therein and the emulsion is dehydrated.

A number of examples of the invention will now be described. These utilize two commercially available clay-type thickeners hereinafter identified as "Bentone 34" and "Baragel." (These are produced by Baroid Chemicals Inc. of the U.S.A.) Both of these thickeners consist of platelets of montmorillonite of approximately 1 x 150 x 150 millimicron particle size coated with a quaternary ammonium salt. In the case of Bentone 34 the salt is dimethyldioctadecyl ammonium chloride.

*Example 1*

The materials used were:

|  | Grams |
|---|---|
| Sodium nitrite | 220 |
| Water | 380 |
| Baragel | 40 |
| Oil | 1400 |
| Acetone | 10 |

The oil was an acid treated distillate lubricating oil fraction obtained from a Tia Juana crude and having a viscosity of 63 cs. at 50° C.

The acetone and the Baragel were mixed with the oil and a solution of the sodium nitrite in the water was stirred into this mixture, to give a coarse emulsion; this mixing was all carried out at ambient temperature. The coarse emulsion was passed through a colloid mill to produce a smooth stable emulsion which was heated at 140° C. with stirring to remove the water. The anhydrous product was a dispersion of sodium nitrite in the oil. The majority of the sodium nitrite particles in the final dispersion had a mean diameter of less than $5\mu$.

(Note: The acetone acts as an activator for the Baragel. The acetone, of course, evaporates during the process.)

*Example 2*

The materials used were:

| | Grams |
|---|---|
| Sodium carbonate | 310 |
| Water | 500 |
| Baragel | 10 |
| Oil | 1310 |
| Acetone | 5 |

The oil was a distillate fraction obtained from a Middle East crude having a viscosity of 37 cs. at 60° C. and a viscosity index of 95.

A dispersion of sodium carbonate was prepared as described in Example 1. 6 g. of an oxidation inhibitor were added as the final dispersion cooled.

The majority of the sodium carbonate particles in the final dispersion had a mean diameter of less than $5\mu$.

*Example 3*

The materials used were:

| | Grams |
|---|---|
| Sodium nitrite | 450 |
| Water | 450 |
| Bentone 34 | 120 |
| Oil | 2500 |
| Acetone | 20 |

The oil and procedure were the same as for Example 1. The majority of the sodium nitrite particles in the final dispersion had a mean diameter of less than $5\mu$.

*Example 4*

The materials used were:

| | Grams |
|---|---|
| Sodium nitrite | 450 |
| Water | 450 |
| Baragel | 40 |
| Acetone | 10 |
| Castor oil | 2500 |

The procedure was the same as for Example 1. The majority of the sodium nitrite particles in the final dispersion had a mean diameter of less than $5\mu$.

*Example 5*

The materials used were:

| | Grams |
|---|---|
| Sodium nitrite | 450 |
| Water | 450 |
| Baragel | 40 |
| Acetone | 10 |
| Silicone fluid | 2500 |

The silicone fluid was a commercially available silicone lubricant having a viscosity of 49 cs. at 60° C.

The majority of the sodium nitrite particles in the final dispersion had a mean diameter of less than $5\mu$.

*Example 6*

A grease was prepared from the following materials:

| | | |
|---|---|---|
| HCO | kg | 1.7 |
| LiOH(H$_2$O) | g | 272 |
| Oil | kg | 11.3 |
| Antioxidant | g | 285 |

In this table HCO means hydrogenated castor oil (which is a form of 12-hydroxystearic acid). The oil used was a Tia Juana vacuum distillate having a viscosity of 68 cs. at 50° C.

The grease was prepared by dissolving the HCO in a portion of the oil and adding the lithium hydroxide (dissolved in five times its own weight of water) to cause saponification. After saponification the mixture was dehydrated and the remainder of the oil was added to the hot mixture. After cooling 2.7 kg. of the sodium nitrite dispersion described in Example 1 were added and the mixture was passed through a colloid mill to give a finished grease which had the following properties:

| | |
|---|---|
| Penetration, unworked (IP 50/62) | 259 |
| Penetration, worked: 60 strokes (IP 50/62) | 271 |
| Penetration, worked: 100,000 strokes (IP 50/62) | 302 |
| Drop point (IP 132/57) | 176° C. |
| Free acidity (IP 37/61) | Nil |
| Free alkalinity (IP 37/61) percent wt | 0.81 |
| Oil separation on storage at 25° C. (IP 121/57) percent wt | 1.1 |
| Bleed test (DTD 825A) percent wt | 4.4 |
| NaNO$_2$ particle size | $<5\mu$ |
| SKF corrosion test | Pass |

*Example 7*

A grease was prepared from the following materials:

| | Kilograms |
|---|---|
| Hydrogenated fish oil fatty acids | 1.70 |
| Calcium hydroxide | 0.23 |
| Oil | 8.07 |

The oil was a Tia Juana vacuum distillate having a viscosity of 33 centistokes @ 50° C.

The grease was prepared by dissolving the fatty acids in a portion of the oil and adding the calcium hydroxide (slurried in four times its own weight of water). After saponification the mixture was dehydrated until the water content was approximately 1.5% weight. The remaining oil was added to the hot mixture and the grease allowed to cool after which 2.1 kg. of the sodium nitrite dispersion described in Example 1 were added and the grease stirred until the sodium nitrite was evenly dispersed.

The grease had the following properties:

| | |
|---|---|
| Penetration, unworked (IP 50/62) | 253 |
| Penetration, worked 60 strokes (IP 50/62) | 270 |
| Penetration, worked 100,000 strokes | 296 |
| Drop point (IP 132/57) | 99° C. |
| Free acid (IP 37/61) | Nil |
| Free alkali (IP 37/61) percent wt | 0.97 |
| Water content (IP 74/62) percent wt | 0.5 |
| SKF corrosion test | Pass |
| NaNO$_2$ particle size | $<5\mu$ |

The SKF corrosion test was carried out in a rig consisting essentially of a 35 millimeter bore, double row, self-aligning ball race fitted with a pressed steel cage and housed in a plummer block. It was operated at 80 revolutions per minute and with no load applied. The bearing is filled with the grease under test and the housing is packed in such a way as to form a cup round the bearing, 20 milliliters of water are introduced into this cup. The rig is run (with water present) on 3 consecutive days for 8 hours each day followed by a 3–4 day static period. At the end of this static period the bearing parts are examined for rusting and corrosion.

The code "IP" followed by a number indicates the serial number of a test which is described in full in the book "Standard Methods for Testing Petroleum and its Products" which is published by the British Institute of Petroleum.

We claim:

1. A method of preparing a suspension of particles of a water soluble solid in an oleaginous medium, in which an aqueous solution of the solid is emulsified with an oleaginous liquid to form a water-in-oil emulsion and the emulsion is thereafter dehydrated by heating at a temperature of 115–170° C., the emulsification and dehydration both being carried out in the presence of a colloidal clay whose particles have been coated with a quaternary ammonium salt, the clay being in an amount of 0.2–5% by weight of the oleaginous liquid.

2. A method according to claim 1 in which the colloidal clay is a material consisting of platelets of montmorillonite coated with a quaternary ammonium salt and wherein the oleaginous liquid is a mineral lubricating oil.

3. A method according to claim 1 wherein the water soluble solid is sodium nitrite.

4. A method of producing a lubricating grease containing a suspension of particles of a water soluble solid in which a suspension of particles of the water soluble solid in an oleaginous liquid is prepared in a manner as specified in claim 1, and the resulting suspension is mixed with a grease, the water soluble solid suspended in the grease being 0.5–5% by weight based on the total grease.

5. A method of producing a lubricating grease according to claim 4, in which the water soluble solid is sodium nitrite.

References Cited by the Examiner

UNITED STATES PATENTS

| | | | |
|---|---|---|---|
| 2,027,582 | 1/1936 | Fain | 252—352 |
| 2,648,633 | 8/1953 | Peterson et al. | 252—28 |
| 2,819,228 | 1/1958 | Dell | 252—309 |
| 2,948,686 | 8/1960 | Gianladis | 252—309 |

FOREIGN PATENTS

| | | |
|---|---|---|
| 778,822 | 7/1957 | Great Britain. |
| 791,413 | 3/1958 | Great Britain. |

DANIEL E. WYMAN, *Primary Examiner.*

I. VAUGHN, *Assistant Examiner.*